Patented Apr. 3, 1923.

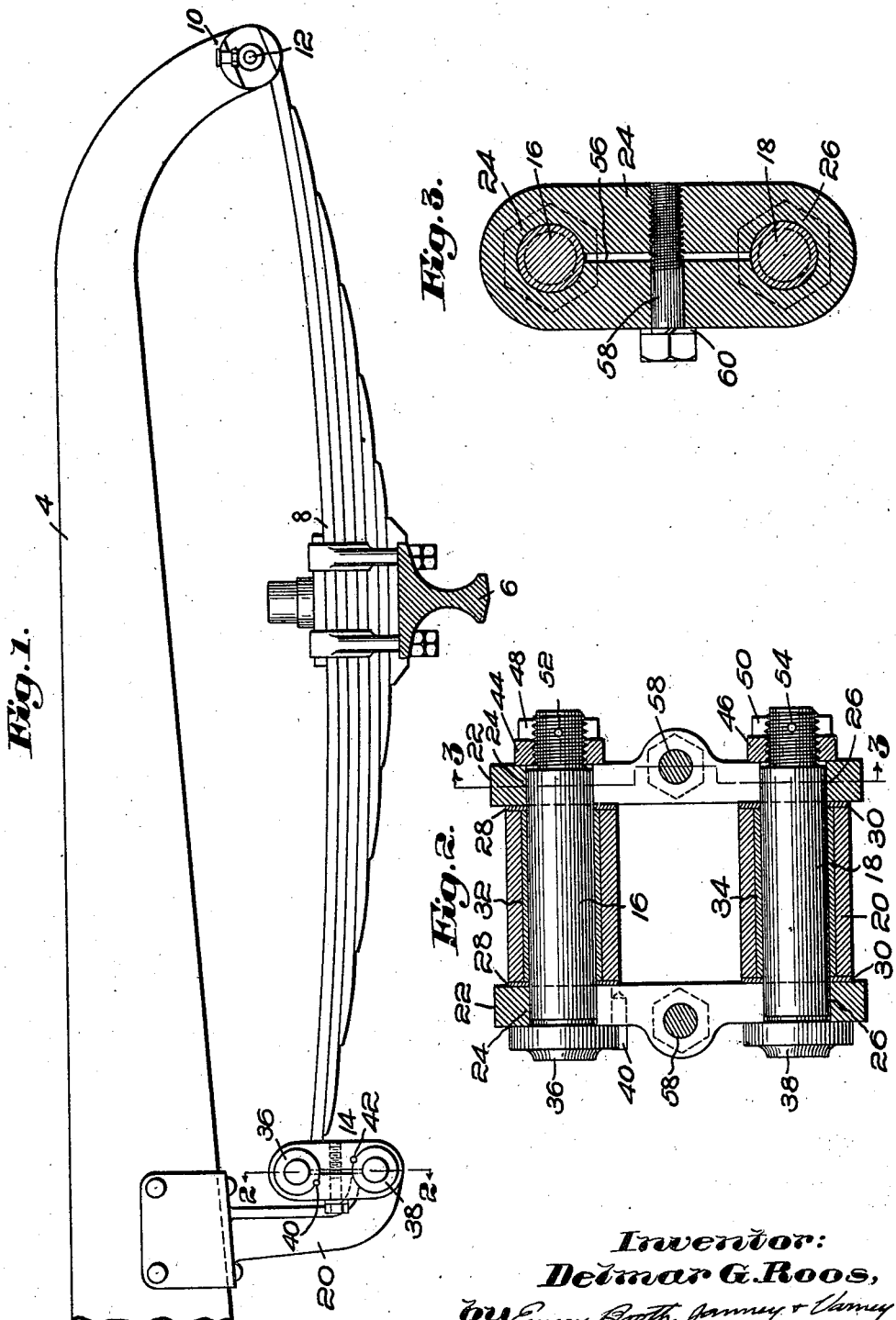
Apr. 3, 1923.                                                 1,450,306
D. G. ROOS
SPRING SHACKLE CONSTRUCTION
Filed Mar. 4, 1920
Inventor:
Delmar G. Roos,
by Emery, Booth, Janney & Varney
Attys.

1,450,306

UNITED STATES PATENT OFFICE.

DELMAR G. ROOS, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

SPRING-SHACKLE CONSTRUCTION.

Application filed March 4, 1920. Serial No. 363,165.

*To all whom it may concern:*

Be it known that I, DELMAR G. ROOS, a citizen of the United States, and a resident of Bridgeport, in the county of Fairfield and State of Connecticut, have invented an Improvement in Spring-Shackle Constructions, of which the following description, in connection with the accompanying drawings, is a specification, like characters on the drawings representing like parts.

This invention relates to a spring shackle construction for vehicles, and is more particularly concerned with a shackle of the type in which two independent links connect the pivots, and in which the least play between the pivots and the holes in the links allows the holes to become worn "bell-mouthed." My invention aims to correct this condition by enabling the links to be pinched firmly into the pivots, thus preventing lateral rocking action and consequent "bell-mouth" enlarging of the holes, while still allowing adjustment to be made in an endwise direction to take up axial wear.

My invention will be best understood by reference to the following description, when taken in connection with the accompanying drawings of one illustrative embodiment thereof, while its scope will be more particularly pointed out in the appended claims:

In the drawings:

Fig. 1 is a side elevation of a portion of a motor vehicle chassis having a spring suspension exemplifying my invention;

Fig. 2 is a sectional view on an enlarged scale on line 2—2 of Fig. 1; and

Fig. 3 is a sectional view on line 3—3 of Fig. 2.

Referring to the drawings, and to the embodiment of my invention which I have selected for exemplification, I have shown the front portion of a motor vehicle having semielliptical springs, although it should be distinctly understood that my invention is susceptible of wide application to spring suspensions of various types. In the present embodiment of my invention, the chassis frame comprises usual longitudinal members, one of which is shown and designated 4, the same being supported on a usual axle 6 by a pair of semi-elliptical springs, one of which is shown and designated 8. As is usually the case, the front end of the spring is pivoted to a horn 10 by a spring bolt 12 passing through the sides of the horn and through the eye of the spring.

The other end of the spring is connected to the frame member by a novel shackle 14, which, in the present example, has its upper end pivoted to the spring-eye by a bolt 16, and has its lower end pivoted by a spring bolt 18 to a bracket 20, the latter being secured to the frame member. In some types of construction, the spring shackle is pivoted directly to the frame member, instead of to the bracket, while in spring suspensions of the platform and three-quarters elliptic types, the shackles connect two springs to each other. My invention is susceptible of application to these and possibly other types.

In the present embodiment, the shackle comprises a pair of independent links 22, each having a bolt-hole 24 for the bolt 16, and a bolt-hole 26 for the bolt 18. Preferably, washers 28 are interposed between the links 22 and the ends of the spring-eye, and likewise washers 30 are interposed between the links and the bracket 20. Preferably, also, bushings 32 and 34 are provided for the spring-eye and bracket, thus presenting renewable bearings for the bolts 16 and 18.

Provision is herein made for adjusting the bolt-holes of the links with reference to the bolts, both longitudinally and transversely of the axes of the latter. In the present example, the bolts are provided, respectively, with heads 36 and 38, bearing against one of the links 22, and held against turning movement with reference to the latter by suitable means, herein pins 40 and 42, which, however, do not restrict axial movement of the bolts.

Longitudinal play is taken up by the use of castellated nuts 44 and 46, threaded onto the bolts 16 and 18, respectively, and provided with radial slots 48 and 50 to receive cotter pins 52 and 54, which prevent the adjustment from being disturbed after it has once been obtained.

Radial adjustment of the bolt-holes 24 and 26 is herein provided for by use of a slot 56 connecting the two bolt-holes and rendering them expansible and contractible. Adjustment is herein effected by the provision of a cap-screw 58 passing through a smooth cylindrical hole at one side of the slot 56, and being threaded into the link at the other side of the slot, as shown in Fig. 3. Suitable means may be provided to lock the cap-screw against accidental turning movement, and for this purpose I have herein provided a lock washer 60 interposed between the head of the screw and the adjacent face of the link.

It should now be evident that, when the spring shackle is first assembled, it can be adjusted so that there is no more endwise play than is essential to a good working fit, and the links can be caused firmly to pinch the pivots, thereby to prevent the holes in the links from wearing "bell-mouthed." This is important because it prevents the rapid initial wear which usually occurs in a non-adjustable shackle, due to side sway and other causes. Subsequently, when wear occurs, it may be compensated for by making the proper adjustments, and with consequent long life of the parts and absence of noise. By the use of the slot 56 intermediate the bolt-holes in the links, a powerful gripping action can be secured, and there is an equalization of the gripping power on both bolts. Thus the bolts can be securely pinched, and the result is practically the same as if a one-piece shackle were employed, instead of independent links. It should be understood, of course, that when axial adjustment of the links becomes necessary, the screws 58 should first be loosened to relieve the grip of the links on the bolt, and after the axial adjustment has been made, the screws should again be tightened.

Having thus described one embodiment of my invention, but without limiting myself thereto, what I claim and desire to secure by Letters Patent is:

1. In a spring shackle construction, the combination of two pivots, a pair of links each provided with openings in which said pivots are received, means to effect adjustment of said links with reference to each other, and other means to effect adjustment of the effective sizes of said openings.

2. In a spring shackle construction, the combination of two pivots, a pair of links each provided with openings in which said pivots are received and provided with a slot connecting said openings, and means to vary the size of said openings by varying the width of said slots.

3. In a spring shackle construction, the combination of two pivots, a pair of links each provided with openings in which said pivots are received and provided with a slot connecting said openings, and means intermediate said openings to vary the size of said openings by varying the width of said slots.

4. In a spring shackle construction, the combination of two pivots, a pair of links each provided with openings in which said pivots are received and provided with a slot connecting said openings, and adjusting screws for reducing the sizes of said openings by drawing the sides of said slots toward each other.

5. In a spring shackle construction, the combination of two pivots, a pair of links connecting said pivots, and two distinct adjusting means to take up play longitudinally and the other to take up play transversely of the axes of said pivots.

6. In a spring shackle construction, the combination of two pivots, a shackle connecting said pivots, means to adjust said parts to compensate for play longitudinally of the axes of said pivots, and other means to adjust said parts to compensate for play transversely of the axes of said pivots.

7. In a spring shackle construction, the combination of two pivots, a pair of links connecting said pivots, bearings interposed between said links, means to adjust said links toward each other to take up play longitudinally of said pivots, and other means relatively to adjust said links and said pivots to take up play transversely of said pivots.

8. In a spring shackle construction, the combination of two pivots, a shackle connecting said pivots and having openings in which said pivots are received, means relatively to adjust said openings and said pivots to take up play in said openings, and other means to adjust said shackle axially of said pivots.

9. In a spring shackle construction, the combination of two pivots, a pair of links each provided with cylindrical openings in which said pivots are received, means to effect adjustment of said links one toward the other along said pivots, and means to effect a clamping action of said links on and about said pivots.

10. In a spring shackle construction, the combination of two pivots presenting cylindrical portions, a pair of links connecting said pivots and presenting cylindrical openings which receive the cylindrical portions of said pivots, bearings on said pivots intermediate said links, means for effecting adjustment of one of said links toward the other along said pivots to take up end play with respect to said bearings, and means for taking up radial play of such link with relation to said pivots.

11. In a spring shackle construction, the combination of two pivots, a shackle connecting said pivots and presenting cylindrical openings to receive them, means to adjust said parts to compensate for play lengthwise of said pivots, and other means to adjust said parts to compensate for play transversely of the axes of said pivots.

In testimony whereof, I have signed my name to this specification.

DELMAR G. ROOS.

Certificate of Correction.

It is hereby certified that in Letters Patent No. 1,450,306, granted April 3, 1923, upon the application of Delmar G. Roos, of Bridgeport, Connecticut, for an improvement in "Spring-Shackle Constructions," an error appears in the printed specification requiring correction as follows: Page 2, line 87, claim 5, after the word "means" insert the word *one;* and that the said Letters Patent should be read with this correction therein that the same may conform to the record of the case in the Patent Office.

Signed and sealed this 5th day of June, A. D., 1923.

[SEAL.]

KARL FENNING,
*Acting Commissioner of Patents.*